Oct. 17, 1950     C. M. WHITEMAN     2,526,102
ANIMAL CHUTE OR RESTRAINING DEVICE
Filed March 4, 1946     2 Sheets-Sheet 1
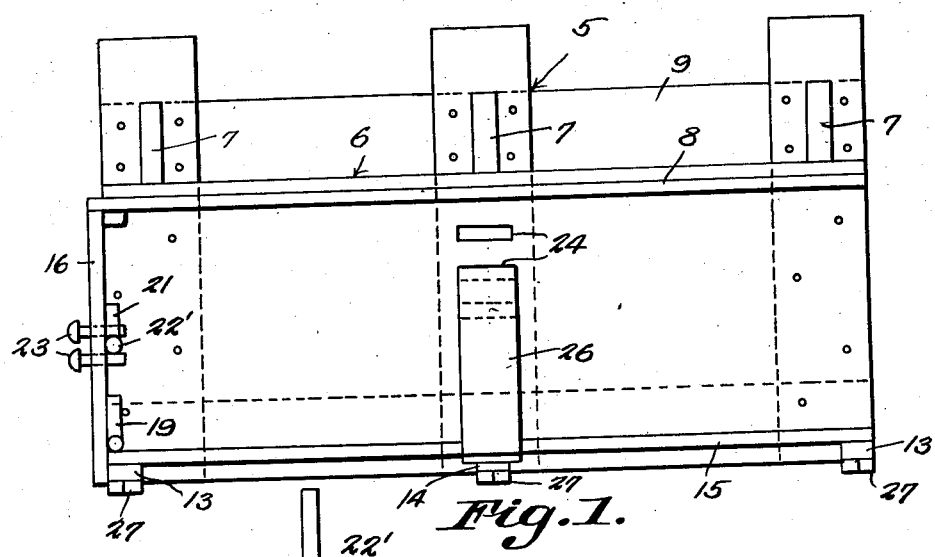
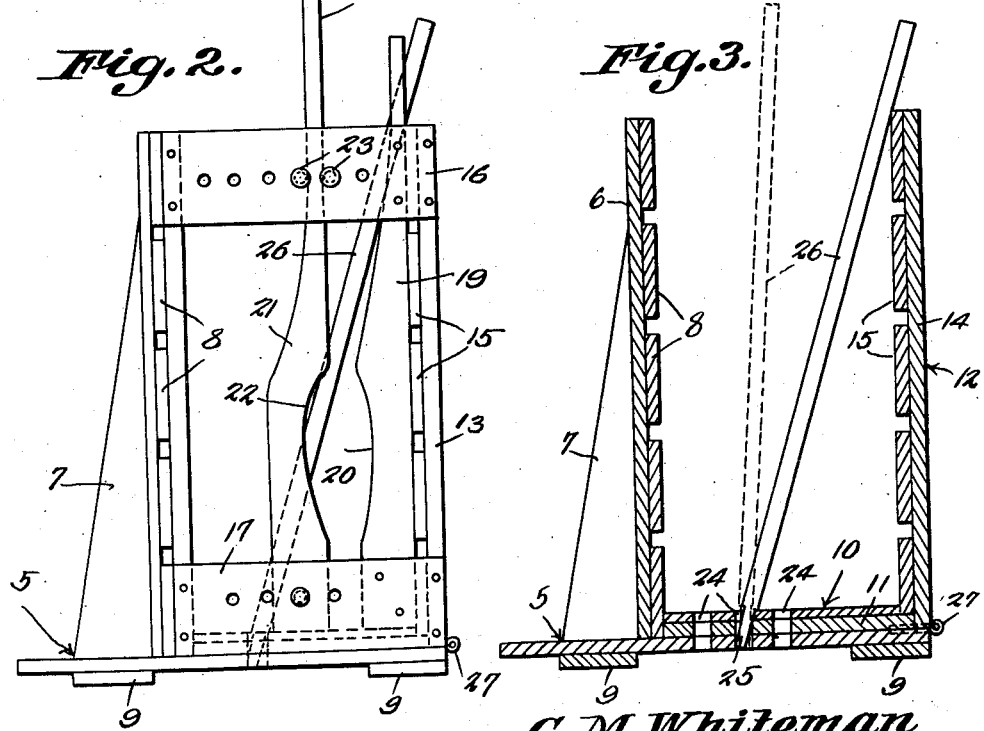
C. M. Whiteman
INVENTOR.
BY
ATTORNEYS.

Oct. 17, 1950     C. M. WHITEMAN     2,526,102
ANIMAL CHUTE OR RESTRAINING DEVICE

Filed March 4, 1946     2 Sheets-Sheet 2

C. M. Whiteman
INVENTOR.

BY *[signature]*
ATTORNEYS.

Patented Oct. 17, 1950

2,526,102

UNITED STATES PATENT OFFICE 2,526,102

ANIMAL CHUTE OR RESTRAINING DEVICE

Charles M. Whiteman, Biggsville, Ill.

Application March 4, 1946, Serial No. 651,816

1 Claim. (Cl. 119—98)

This invention relates to animal chutes or restraining devices designed primarily for holding hogs while nose rings are being applied, or while the animal is being vaccinated or otherwise treated.

An important object of the invention is to provide a device of this character wherein a hog held therein may be turned on his side to permit the hog to be treated with facility.

Another object of the invention is to provide a restraining device of this character, the clamping bars thereof being adjustable to grip and hold hogs of various sizes.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a plan view of a restraining device constructed in accordance with the invention.

Figure 2 is an end elevational view.

Figure 3 is a sectional view taken on line 3—3 of Figure 4.

Figure 4:
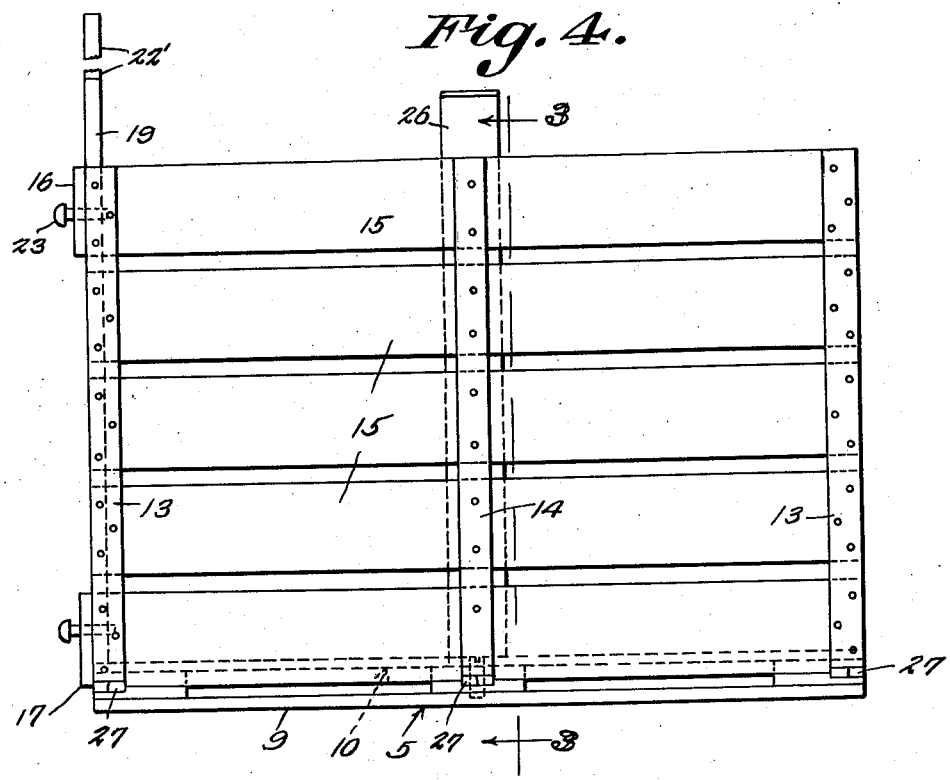
Figure 4 is a side elevational view of the device.
Figure 5:
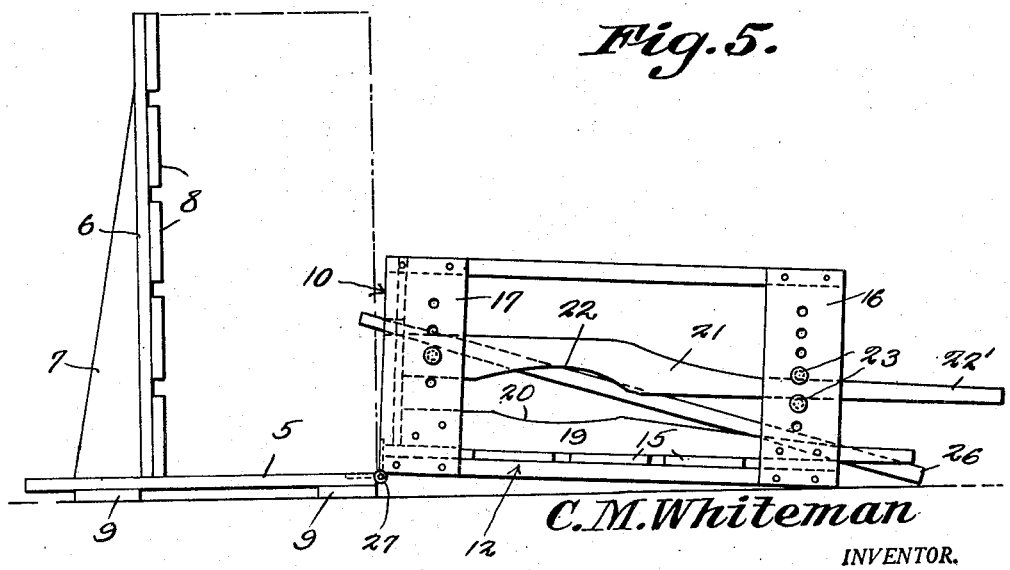
Figure 5 is an end elevational view of the device illustrating the movable section thereof as swung outwardly to its horizontal position.

Referring to the drawings in detail, the chute comprises a main stationary section embodying a platform 5 and upstanding bars 6, held in their upright positions by means of the braces 7. Connecting the upstanding bars 6 are horizontal spaced bars 8 that extend to the upper ends of the bars 6, as clearly shown by Figure 5 of the drawings. The platform 5 also includes boards 9 that are arranged longitudinally of the platform and connect the boards of the platform.

The chute also includes a pivoted section embodying the base 10 which is constructed of wide boards 11 that form the major portion of the base 10. This pivoted section also includes the side 12, which is constructed of vertical end bars 13 and a central brace bar 14. Side boards 15 connect the end bars 13 and central brace bar 14, and provide the side for the pivoted section. At one end of the pivoted section is the upper bar 16 and lower bar 17, the upper and lower bar being connected with the vertical bar 13 that has its lower end connected with the wide boards 11 of the base section.

Thus it will be seen that due to this construction, I have provided an adjustable section which, when moved to its horizontal position, is open at its top, one side and one end, the bars 8 closing the open side of the pivoted section, when the pivoted section is moved to its upright position. Secured between the upper and lower spaced bars 16 and 17, is a stationary clamping bar 19 that is formed with a curved edge 20, adapted to fit around the neck of a hog. Cooperating with the stationary clamping bar 19 is a movable clamping bar 21 which is pivotally mounted between the lower spaced bars 17, the upper end thereof being movable between the upper spaced bars 16, the extreme upper end of the movable bar providing a handle 22', by means of which the movable bar may be moved to its clamping position. This movable bar 21 is also provided with a curved edge 22, designed to fit the curvature of the neck of a hog. Registering openings are formed in the upper spaced bars 16 and these registering openings accommodate the pins 23, which are positioned at opposite sides of the handle 22' when the movable bar has been placed in its proper gripping position. By moving the pins 23 it would be obvious that the movable bar may be adjusted to meet various requirements.

Spaced openings 24 are provided in the bottom of the pivoted section, and these openings 24 accommodate the reduced end 25 of the holding bar 26, the reduced end of the holding bar being appreciably smaller than the openings, to allow the holding bar to tilt or move from the dotted line position as shown by Figure 3 of the drawings, to the full line position, thereby to press against the hips of the hog held within the device, when pressure is directed to the holding bar, preventing the hog from moving.

The pivoted section is secured to the platform 5 by means of the hinges 27 which permit the pivoted section to swing laterally of the platform, should it be desired to treat the hog while lying on its side.

From the foregoing it will be seen that due to the construction shown and described, a hog may be driven into the chute or restraining device, and his neck clamped between the bars 19 and 21. The pins 23 are now positioned to hold the movable bar in its adjusted position, and should it be desired to throw the hog on its side, it is only necessary to swing the pivoted section laterally to the position shown by Figure 5 of the drawings.

It will, of course, be understood that during this operation, the holding bar 26 will be pressed against the hips of the hog to hold it against turning, should it attempt to arise.

What is claimed is:

In an animal restraining device comprising a body including a stationary section embodying a platform and a side member rising from one edge of the platform, the body being open at its top and ends, a pivoted section embodying a floor, a side member rising from the floor, an end member normally obstructing one end of the pivoted section and body, said end member comprising spaced upper and lower bars, a pivoted animal clamping bar mounted between the upper and lower spaced bars, said pivoted platform and floor having transversely elongated openings, a removable clamping bar, one end of the removable clamping bar being reduced and adapted to be positioned in one of the transversely elongated openings holding said removable clamping bar in position, and said removable clamping bar adapted to clamp the sides of the animal.

CHARLES M. WHITEMAN.

REFERENCES CITED

The following references are of record in the file of this patent:

UNITED STATES PATENTS

| Number | Name | Date |
|---|---|---|
| 134,707 | Scott et al. | Jan. 7, 1873 |
| 538,442 | Driver | Apr. 30, 1895 |
| 970,344 | Mills | Sept. 13, 1910 |
| 1,171,878 | Pierce | Feb. 15, 1916 |
| 1,443,561 | Clark | Jan. 30, 1923 |